United States Patent
Fu et al.

(10) Patent No.: US 11,602,154 B2
(45) Date of Patent: Mar. 14, 2023

(54) CREAMERS AND METHODS OF MAKING SAME

(71) Applicant: NESTEC S.A., Vevey (CH)

(72) Inventors: Xiaoping Fu, Dublin, OH (US);
Alexander Sher, Dublin, OH (US);
Winnie Octavia, Delaware, OH (US);
Dominick Damiano, Dublin, OH (US);
Ken Erickson, Dublin, OH (US);
Richard Nelson, Glendale, CA (US);
David Eckerle, Marysville, OH (US);
Madansinh Vaghela, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 893 days.

(21) Appl. No.: 15/189,509

(22) Filed: Jun. 22, 2016

(65) Prior Publication Data

US 2017/0020154 A1    Jan. 26, 2017

Related U.S. Application Data

(60) Provisional application No. 62/185,047, filed on Jun. 26, 2015.

(51) Int. Cl.
*A23C 11/00*    (2006.01)

(52) U.S. Cl.
CPC .................. *A23C 11/00* (2013.01)

(58) Field of Classification Search
CPC ......... A23C 11/00; A23C 11/02; A23C 11/04; A23C 11/045; A23C 11/06; A23C 11/065; A23C 11/08; A23C 11/10; A23C 11/103; A23C 11/106

See application file for complete search history.

(56) References Cited

U.S. PATENT DOCUMENTS

| | | | | |
|---|---|---|---|---|
| 5,643,627 A | * | 7/1997 | Huang | A23C 9/137 426/578 |
| 2004/0062846 A1 | * | 4/2004 | Sargent | A23C 9/1512 426/601 |
| 2012/0015082 A1 | * | 1/2012 | Holst | A23C 3/037 426/241 |
| 2014/0010945 A1 | * | 1/2014 | Bot | A23L 1/193 426/602 |
| 2014/0044854 A1 | * | 2/2014 | Bezelgues | A23C 11/00 426/583 |

OTHER PUBLICATIONS

Kirk-Othmer, Food and Feed Technology, 2008, Wiley Interscience, p. 330.*

* cited by examiner

Primary Examiner — Changqing Li
(74) Attorney, Agent, or Firm — K&L Gates LLP

(57) ABSTRACT

Natural Creamers for providing whitening and indulgent texture/mouthfeel of beverage and food products are provided. The creamers have long-term stability, high whitening capacity and a pleasant mouthfeel when added to beverage and food, while being free from artificial additives. In a general embodiment, the present disclosure provides a creamer comprising added sugar, milk fat, milk proteins and optionally natural flavors and free of any artificial additives. Wherein the ratio of milk fat:milk protein is less than 5.3:1; and wherein the Lumisizer instability index of liquid creamer is less than 10.

7 Claims, 3 Drawing Sheets

CREAMERS AND METHODS OF MAKING SAME

PRIORITY CLAIM

This application is based upon and claims the benefit of priority from U.S. Provisional Patent Application Ser. No. 62/185,047, filed on Jun. 26, 2015, the entire contents of which are incorporated herein by reference.

BACKGROUND

The present disclosure generally relates to food products. More specifically, the present disclosure relates to creamers for food products such as coffee and tea.

Creamers are widely used as whitening agents, also as the texture/mouthfeel modifier with hot and cold beverages, e.g., coffee, cocoa, tea, etc. They are commonly used in place of milk and/or dairy cream. Creamers may come in a variety of different flavors and provide a whitening effect, mouthfeel, body, and a smoother texture.

Creamers can be in liquid or powder forms. One disadvantage of powder forms is that they do not generally provide an impression of traditional dairy creamers. Another disadvantage of using powder creamers may include difficulties in dissolution when added to coffee, and also the possibility of having a non-homogeneous beverage.

More and more consumers are concerned by the synthetic or artificial additives in food products. Thus, there is a demand for commercially available natural creamers. Usually non-dairy creamers contain stabilizers such as carrageenan, cellulose gums, cellulose gels, emulsifiers, or buffers or whitening agents that are all not perceived as natural by the consumers. These perceived artificial and unhealthy food ingredients, however, are typically needed to guarantee the physical stability of the non-dairy creamer over the shelf life of the product and after pouring into coffee. In addition they are needed to achieve the desired whitening and texture/mouthfeel effect in the coffee. In the absence of these ingredients, the coffee creamers are much less stable over time and show less whitening and adverse sensorial effects. This means that without the addition of emulsifiers and stabilizers, the conventional non-dairy creamers cannot be stored up to 6 months shelf-life without severe physical destabilization of the creamers or functionality in the finished beverages.

Currently, "pseudo natural creamers" do exist, which are dairy or non-dairy based and contain one or more of the following: hydrocolloids as stabilizers/thickeners, emulsifiers, buffer salts, such as dipotassium phosphate, sodium citrate, chelators and sometime artificial and natural flavors. Although touted as being natural, these pseudo natural creamers are not completely natural.

Half and half can be considered a natural dairy creamer but it does not sweeten and/or flavor the coffee. Furthermore, the mouth feeling and masking of the coffee by half and half coffee creamers is significantly weaker than artificial whiteners. Therefore, there is a need for natural creamers having long-term (up to 6 months) shelf stability, excellent whitening and sensorial properties. Also, the natural creamers should be free-flowing, and homogeneous. The fat emulsion should be stable and free of aggregates or clumps during its shelf life. It should also provide good sensorial properties without any physical instability when added to beverages. Currently, half and half cannot reach to the 6 month shelf life without clumping even when stored at a refrigerator temperature (4° C.) with additives.

SUMMARY

The present disclosure relates to creamers for food products and methods of making the creamers. The creamers can be stored at refrigerated temperatures and be stable for extended periods of time (up to 9 months). The creamers have high whitening capacity and a pleasant mouthfeel while masking the bitterness and astringency of a beverage. In a general embodiment, the present disclosure provides a creamer free of additives comprising sugar, milk fat, milk proteins and optionally natural flavor, wherein the ratio of milk fat:milk protein is less than 5.3:1; wherein the Lumisizer instability index is less than 10.

In an embodiment of the present invention, the milk phospholipids are more than 0.08 mg/g of total solids of product.

Embodiments of the present disclosure provide a natural, dairy-based, liquid creamer that does not contain any stabilizers, emulsifiers, buffers or whitening agents, and exhibits stability up to 9 months at refrigeration temperatures (e.g. 4° C.) and provides good whitening and sensorial effects in beverages, such as coffee.

In another embodiment of the present invention, the creamer comprises sugar comprising one or more of monosaccharides, disaccharides, trisaccharides, polysaccharides (e.g., maltodextrin) or a combination thereof. The sugar source may be derived from sugar beet, sugar cane. The sugar may also be derived internally from sweetened condensed milk, condensed milk, honey, molasses, agave syrup, maple syrup, malt, corn, tapioca, potato or a combination thereof.

In an embodiment, the protein can be from a protein source including at least one of the following: liquid cow's milk, soy milk, heavy cream, buttermilk, chocolate milk, condensed milk, sweetened condensed milk, evaporated milk, whey protein microgels, casein, and caseinates, whole milk powder, nonfat dry milk powder or a combination thereof. In another embodiment, the fat can be from a fat source including at least one of the following: heavy cream, liquid whole milk, partially defatted liquid milk, whole milk powder, anhydrous milk fat or a combination thereof. The creamer can further include any other suitable ingredients such as natural flavors, sweeteners and/or colorants.

In another embodiment, the present disclosure provides a natural dairy creamer comprising between about 1% and about 35% by mass of added sugar, between about 3.3% and about 10.2% by mass of a fat, and about 1% and about 5% by mass of a protein The natural dairy creamer may exclude hydrocolloids, additional added emulsifiers, buffers and whitening agents.

In an embodiment of the consumable product, the fat ranges between about 3.3% and 10.2% by mass of the creamer. The fat can be from a fat sources including at least one of heavy cream, liquid whole milk, partially defatted liquid milk, whole milk powder, anhydrous milk fat or a combination thereof.

In an alternative embodiment, the present disclosure provides a method of making a creamer. The method comprises combining a fat, a sugar and a protein to form a mixture having a sugar:protein mass ratio ranging from about 35:1 to about 1:5, and heating the mixture at a temperature ranging from about 0.5° C. to about 85° C.

In an embodiment, the present disclosure provides a method of hydrating non-fat dried milk powder (NFDM)

and flavor powder during making a creamer. The method comprises combining a portion of sugar syrup (66% solid) at 45° C. to about 85° C., a portion of raw milk, non-fat dried milk powder and flavor powder to form a mixture having a sugar:milk:powder ingredients in mass ratio ranging from about 1:1:1 to about 2:2:1. Mixing the portion of sugar syrup and milk with powder ingredients results in a complete hydration of milk proteins (FIG. 3 in examples 2) without foaming.

In an embodiment of the method, the dairy source is from raw milk/cream or pasteurized milk/cream. In an embodiment of this method, the dairy creamer does not include any hydrocolloids, additional emulsifiers, buffers or whitening agents.

One aspect of the present invention relates to a process for manufacturing creamer of claim 1, comprising the steps of: (i) obtaining ingredients including milk fat kept under low agitation or alternative process conditions to avoid foam generation; (ii) preparing a premix solution comprising milk proteins and sugar syrup (for instance kept at 66° C.) in a 50:50 ratio; (iii) low shear mixing of the premix in presence of nonfat dry milk powder to achieve a completed hydration of dry ingredients and optionally add flavour; (iv) following hydration, further addition of the ingredients from step (i) is done under low agitation such that mixture produces no or minimal foam; by such method of mixing produces no or minimal foam, during these processes it ensures no loss of phospholipids which in turn provides physical stability to creamers; (v) homogenization at conditions configured to obtain an emulsion particle size ranging from 0.01 to 2 μm (micrometers) with a d50<1 μm and d90<1.5 μm, and lack of any particles above 10 μm; (vi) UHT treatment; and (vii) filing the container aseptically at 0.5-20° C.

In one embodiment of the present invention, the UHT treatment temperature is at a minimum 141° C. for about 3 seconds or any other suitable combinations.

An advantage of the present disclosure is to provide a natural creamer having a high whitening capacity, good sensory properties and physical stability during storage without using artificial ingredients.

Another advantage of the present disclosure is to provide a natural dairy-based liquid creamer that does not include any hydrocolloids, added emulsifiers, buffers or whitening agents.

Yet another advantage of the present disclosure is to provide a long-term, stable creamer having excellent whitening effect that is stable for at least 9 months at a temperature of about 0.5° C.-20° C. In an embodiment the aseptic filling is done at 0.5-7.2° C.

Yet another advantage of the present disclosure is to provide a long-term, stable creamer having excellent homogeneity. That is without any phase separation, clogs, clumps or gelling.

Another advantage of the present disclosure is to provide a liquid creamer that has a good mouthfeel, body, smooth texture, and a good flavor without off-notes.

Additional features and advantages are described herein, and will be apparent from, the following Detailed Description and the figures.

DETAILED DESCRIPTION

Figure 1:
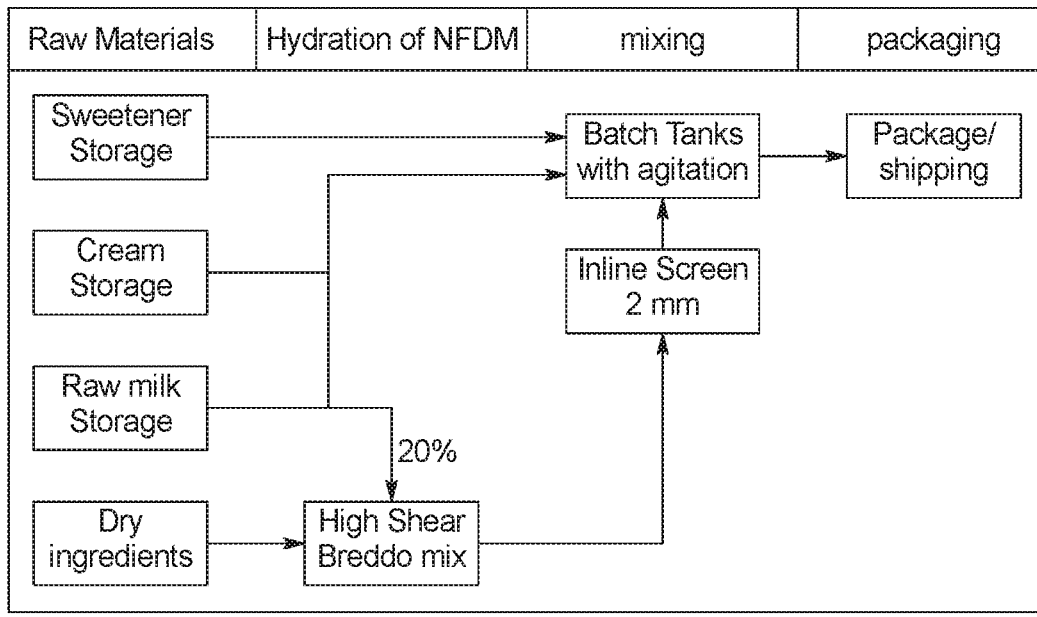
FIG. 1 shows a lower shearing process to avoid foaming and thus loss of phospholipids
Figure 2:
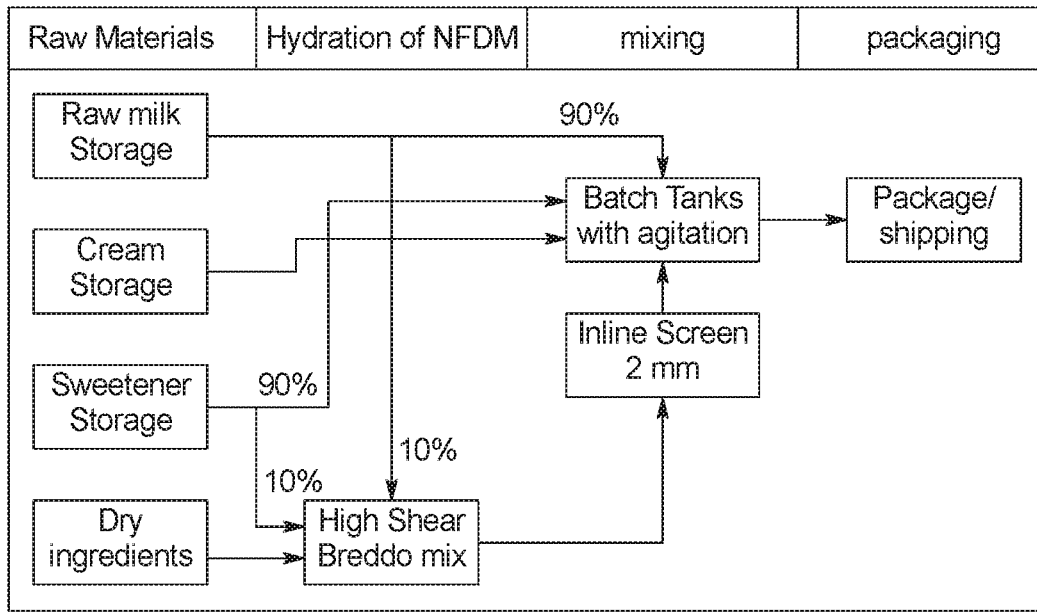
FIG. 2 shows a processing map of powder ingredients hydration and mixing without foam formation and loss of phospholipids.

The present disclosure relates to creamers and methods of making the creamers. The creamers can be in a liquid form and added to any suitable beverage in an amount sufficient to provide whitening, creaming, as well as preferred sensorial effects in the beverage. A creaming effect imparts qualities associated with cream or dairy such as desirable flavor, texture, body, and/or color (e.g., lightening or whitening). In alternative embodiments, the creamers are natural, dairy-based, and stable. They can include combinations of milk (skim or whole, raw or pasteurized), heavy cream, sugar (as well as natural sweeteners) and a natural flavor. The fat, protein and sugar in the creamer can all come from natural sources. The creamer possesses a refrigerated stability without developing unfavorable phenomena such as aggregation, separation, gelling, clogging or clumping in itself, or feathering, oil off, aggregation or cream separation, for example, after addition to a hot beverage such as coffee or tea.

As used herein, the term "stable" means remaining in a state or condition having no phase separation (e.g., creaming, sedimentation, and/or age gelation) or spoilage or bitterness (e.g., due to storage) for an extended period of time (e.g., for at least 9 or more months) at refrigerated conditions (e.g., about 0.5-7.2° C.).

In a general embodiment, the present disclosure provides a creamer free of additives comprising sugar, milk fat, milk proteins and optionally natural flavor, wherein the ratio of milk fat:milk protein is less than 5.3:1; and Lumisizer instability index is less than 10 and wherein the milk phospholipids are more than 0.08 mg/g total solid of product.

The creamers in embodiments of the present disclosure differ from conventional dairy creamers that contain additives such as hydrocolloids (e.g., cellulose, microcrystalline cellulose, carboxy-methyl cellulose, carrageenan, agar-agar, cornstarch, gelatin, gellan, guar gum, gum arabic, kojac, locust bean gum, methyl cellulose, pectin, sodium alginate, tapioca maltodextrin, tracaganth, xanthan, etc.), anti-foaming agents, surfactants, oils, added emulsifiers (e.g., lecithin, monoglycerides, succinic acid esters of monoglycerides, diacetyl tartaric acid esters of monoglycerides, etc.), buffers (e.g., monophosphates, diphosphates, sodium mono- and bicarbonates, potassium mono- and bicarbonates, etc.) and whitening agents (e.g., titanium dioxide, etc.) that are usually used to achieve the desired shelf-life stability and performance (e.g., whitening properties) of dairy or non-dairy based creamers. Although the creamers in embodiments of the present disclosure do not contain any artificial additives (e.g., hydrocolloids, thickeners, stabilizers), the creamers are able to exhibit similar or superior texture, sensorial properties and stability or whitening power than respective conventional dairy creamers containing artificial additives.

It has been unexpectedly found that the ratio of fat to protein (less than 5.3 to 1), total milk phospholipids content in the product (more than 0.08 mg/g) and minimal foam formation during processing (minimizing the loss of milk phospholipids due to foaming) have a tremendous impact on products physical stability during storage. Addition of nonfat dry milk to increase the protein content in the products to achieve the ratio of fat to protein (less than 5.3 to 1) has significantly improved product stability. It has been also found that the total hydration of nonfat dry milk (i.e. proteins) is critical to result in a preferred emulsion with a fat droplet size ranged from 0.01 to 2 μm and without any larger particles. The addition and total hydration of non-fat dry milk can be achieved by utilizing a portion of sugar syrup (66% @66° C.) and a portion of milk (@4° C.) under a high shear recirculation and mixing without foam formation, as demonstrated in the example 2. The mass ratio of sugar syrup, milk and non-fat dry milk was ranged from 1:1:1 to 2:2:1. As used herein, the term 'mass' can also be considered equivalent to 'weight' where appropriate.

In any embodiments of the creamer of the present disclosure, the sugar:protein mass ratio of the creamer can range between about 35:1 and 1:5. More specifically, the sugar: protein mass ratio can be about 1:5, 2:5, 3:5, 5:1, 10:1, 10.5:1, 11:1, 11.5:1, 12:1, 12.5:1, 13:1, 13.5:1, 14:1, 14.5:1, 15:1, 15.5:1, 16:1, 16.5:1, 17:1, 17.5:1, 18:1 and the like. It should be appreciated that any two amounts of the sugar: protein mass ratio recited herein can further represent end points in a preferred range of the sugar:protein mass ratio. For example, the amounts of 13.5:1 and 16:1 can represent the individual sugar:protein mass ratios in the creamer as well as a preferred range of the sugar:protein mass ratio in the creamer ranging between about 13.5:1 and about 16:1.

In any embodiments of the creamer of the present disclosure, the sugar (e.g., sucrose, monosaccharides, disaccharides, trisaccharides, polysaccharides, etc.) can be from any suitable sugar source. Non-limiting examples of the sugar source include beets, canes, condensed milk, honey, molasses, agave syrup, maple syrup, malt, corn, tapioca, potato sugar cane juice, yacon syrup or a combination thereof. Non-limiting examples of the natural sweeteners source include Lou Han Gou (monk fruit) extract, stevia, rebaudiosides, etc. In any embodiments of the creamer of the present disclosure, the amount of added sugar in the creamer can range between about 12% and about 35% by mass. More specifically, the sugar can be about 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35% by mass and the like. It should be appreciated that any two amounts of the sugar recited herein can further represent end points in a preferred range of the sugar. For example, the amounts of 20% and 25% by mass can represent the individual amounts of the sugar in the creamer as well as a preferred range of the sugar in the creamer ranging between about 20% and about 25% by mass.

In any embodiments of the creamer of the present disclosure, the protein can be from a protein source such as liquid cow milk, soy milk, heavy cream, buttermilk, chocolate milk, condensed milk, evaporated milk, whey protein microgels, whole milk powder, nonfat dry milk powder or a combination thereof. In any embodiments of the creamer of the present disclosure, the amount of protein present in the creamer can range between about 1% and about 5% by mass. More specifically, the protein can be about 1%, 1.2%, 1.4%, 1.6%, 1.8%, 2%, 2.2%, 2.4%, 2.6%, 2.8%, 3%, 3.2%, 3.4%, 3.6%, 3.8%, 4%, 4.2%, 4.4%, 4.6%, 4.8%, 5% by mass and the like. It should be appreciated that any two amounts of the protein recited herein can further represent end points in a preferred range of the protein. For example, the amounts of 2.2% and 4.4% by mass can represent the individual amounts of the protein in the creamer as well as a preferred range of the protein in the creamer ranging between about 2.2% and about 4.4% by mass.

In any embodiments of the creamer of the present disclosure, the fat (e.g., oil) can be from a fat source including at least one of heavy cream, liquid whole milk, partially defatted liquid milk, whole milk powder, anhydrous milk fat or a combination thereof. In any embodiments of the creamer of the present disclosure, the amount of fat in the product can range between about 3.3% and about 10.2% by mass. More specifically, the fat can be about 3.3%, 4%, 5%, 6%, 7%, 8%, 9%, 10%, 10.2%, by mass and the like. It should be appreciated that any two amounts of the fat recited herein can further represent end points in a preferred range of the fat. For example, the amounts of 3.3% and 5% by mass can represent the individual amounts of the fat in the creamer as well as a preferred range of the fat in the creamer ranging between about 3.3% and about 10.2% by mass.

The creamers in embodiments of the present disclosure can further include any other suitable ingredients such as natural flavors, natural sweeteners and/or natural colorants. Flavors can be, for example, chocolate, cocoa, hazelnut, caramel, vanilla, etc. Sweeteners can be, for example, stevia extract, Luo Han Guo extract, etc. Usage level of the flavors, sweeteners and colorants will vary greatly and will depend on such factors as the level and type of flavors, sweeteners and colors used and cost considerations.

The creamer alternative embodiments of the present disclosure can be stored at refrigerated temperatures not causing unfavorable phenomena such as aggregation, separation, gelling, clogging or clumping in itself or in the finished beverages when the creamer is added to coffee/tea.

The creamers in alternative embodiments of the present disclosure can be easily dispersible in coffee and stable in hot and cold acidic environments without one or more of the following problems: feathering, breaking emulsion, de-oiling, flocculation and sedimentation. When added to coffee, tea, cocoa or other liquid products, the creamers can provide a high whitening capacity, a good mouthfeel, full body, smooth texture, and also a good flavor with no off-flavor notes that could be developed during storage time. The creamers can be used with other various food products such as cereals, as cream for berries, creamers for soups or in many cooking applications.

In an embodiment of the method, the dairy source having the fat and the dairy source having the protein are in a pasteurized, raw or a combination of both the forms before being combined with the sugar. The dairy source having the fat, the dairy source having the protein and the dairy source having the phospholipids can be the same dairy source or each be from one or more different dairy sources. In an embodiment of this method, the dairy creamer does not include any hydrocolloids, added emulsifiers, buffers or added whitening agents.

As an example of the method according to an embodiment of the present disclosure, a dairy creamer can be prepared by mixing cream, milk (e.g., skim or whole) and sugar. This dairy mixture can be exposed to a temperature ranges from about 0.5° C. to about 85° C. for a suitable time (e.g., about 20, 25, 30, 35, 40, 45, 50, 55, 60 or more minutes). The dairy mixture can then be sterilized by steam injection or infusion, for example, at minimum of about 141° C. for about 3 seconds or any other suitable heat treatment.

As an example of the method according to an embodiment of the present disclosure, the nonfat or whole fat dry milk powders and flavor powders can be totally hydrated by using sugar syrup, milk and powder ingredients at mass ratio of 1:1:1, 1.5:1.5:1, 1:2:1, 2:1:1, and 2:2:1 under recirculated high shear agitation. The temperature for the pre-mix is ranged from 30 to 45° C. due to the heat from previous heated sugar syrup. Premix is done to avoid foam formation so that phospholipid content is maintained wherein heat is obtained from sugar syrup stored at 66° C. and water is obtained from liquid milk (e.g. skim or whole). Premixing dissolves the powdered ingredients in a consistent manner.

In any embodiments of the methods described herein, during processing and production of the creamer, the mixing of any components of the creamers such as proteins/dairy product, fat/dairy product, sugar(s), flavor(s), etc., in liquid can be done under agitation, with or followed by heat treatment, homogenization, cooling and filling aseptic containers under aseptic conditions. Aseptic heat treatment may use direct or indirect ultra-high temperature ("UHT") steam injection or steam infusion processes. UHT processes are known in the art. Examples of UHT processes include UHT sterilization and UHT pasteurization.

Direct heat treatment can be performed by injecting steam in the mix. In this case, it may be necessary to remove excess water, by flashing. Indirect heat treatment can be performed with a heat transfer interface in contact with the mix. The homogenization could be performed before and/or after the heat treatment. It may be interesting to perform homogenization before heat treatment in order to improve heat transfers in the mix, and thus achieve an improved heat treatment. Performing a homogenization after heat treatment usually ensures that the oil droplets in the emulsion have the desired dimension. Aseptic filling is described in various publications, such as articles by L. Grimm in "Beverage Aseptic Cold Filling" (Fruit Processing, July 1998, p. 262-265), by R. Nicolas in "Aseptic Filling of UHT Dairy Products in HDPE Bottles" (Food Tech. Europe, March/April 1995, p. 52-58) or in U.S. Pat. No. 6,536,188 B1 to Taggart, which are incorporated herein by reference.

The Lumisizer (LUM, Germany) Model 611 was used to evaluate the stability against creaming. Lumisizer (LUM, Germany), is an instrument using light scattering detection under sample centrifugation. It is especially designed to assess different separation phenomena based on oil droplet creaming or particle sedimentation occurring in oil-in-water emulsions and dispersions. In the Lumisizer, the so-called STEP technology (Step and Time resolved Extinction Profiles) is used. The samples were measured without dilution and centrifugal forces were exerted up to 2 hours at 20° C. and 2300 g force. The transmission profiles of samples were taken every 20 sec.

From the raw transmission profiles, the integral of transmission over time is calculated and its slope (named an Instability Index) was used as a quantitative measure for emulsion instability against creaming. Separation graphs shows movements of the interface between the dispersed phase, i.e. the movement of emulsion layers, and the clear phase, as a function of time.

The difference in separation rates (Instability Index) between the samples allowed to assess relative stability of emulsions against creaming. The integral transmission (T) was plotted as a function of time (t), and the slope ($\Delta T/\Delta t$) was calculated. A higher slope (Instability Index) indicates a faster separation and thus a less stable product.

Milk protein would be whey and casein, wherein ratio of casein and whey is 80:20.

EXAMPLES

By way of example and not limitation, the following examples are illustrative of various embodiments of the present disclosure.

Example 1

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Low Shear Processing

Blending:
650 lbs. of milk was added into the recirculation loop (so the dry ingredients can be incorporated) without high shear being applied. Only the circulation pump in the high shear mixer is turned on and 95 lbs non-fat dry milk (NFDM) was added. As soon as NFDM addition is completed, the high shear mixers are stopped and continue recirculation to the batch tank. After mixing, the mixture temperature is around 4° C. Foam was observed on the top of the mix. Then without high shear, 50 lbs. of flavor was added, the recirculation loop was closed off and all products removed from the high shear mixer and recirculation loop back into the batch tank.

With the swept agitators on at ~18 RPM in the batch tank 3500 lbs sugar syrup (66% @60° C.), 2700 lbs skim milk (4° C.), and 2300 lbs cream (4° C.) was added into the batch tank. Ingredients were gently stirred till a uniform mixture of all ingredients was obtained. As the result of such the processes, 100 lbs or more foam was formed, the foam contained 50% fat and 1.2 mg/g phospholipids. The foam was discarded.

The non-foaming fractions from batch tanks were harvested and it results in a mixture with 9.3% fat, 30% sugar, 1.8% proteins, 0.04 mg/g phospholipids and total 40% solids. The processing steps are shown in FIG. 1

Pasteurization and Homogenization Pressure and Efficiency

Figure 6:
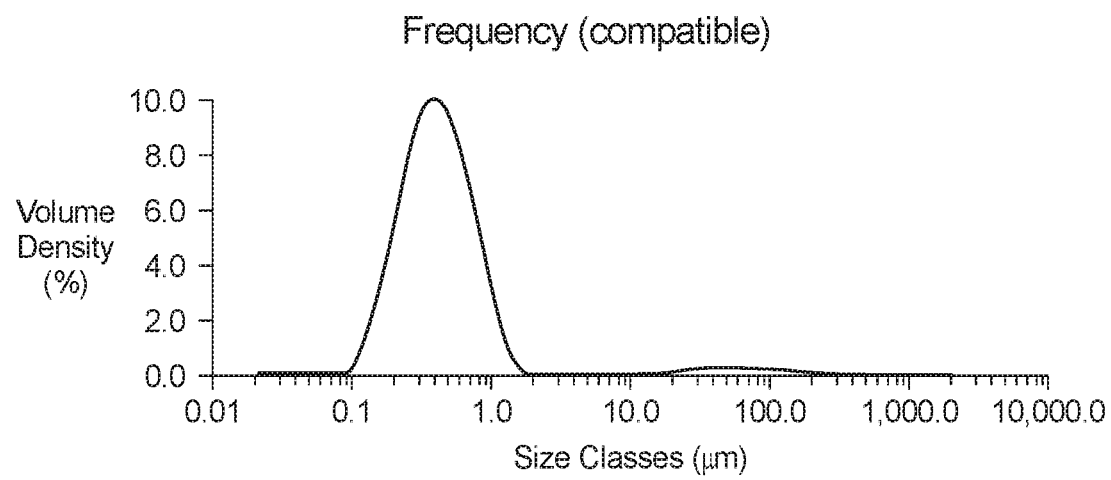
FIG. 6: particle size distribution from a lower shear process after homogenization

A thermal process was achieved by a UHT treatment at 141° C. for 3 seconds; homogenization pressure was achieved by setting the second stage at 500 psig and the first stage at 2000 psig to achieve a total pressure of 2500 psig. After homogenization, an emulsion with particle sizes ranging from 0.01 to 200 µm and with 99% particles with a ranging from 0.01 to 2 µm were obtained (FIG. 6). The particles ranged from 10 to 200 µm are probably the non-hydrated milk protein from non-fat-dried-milk powder.

Filling, Package and Shipping

Products were aseptically filled to plastic bottles at 4° C. and stored at refrigeration temperature (4° C.) for distributions.

The final product contained 9.3% fat, 30% sugar, 1.8% proteins, 0.04 mg/g phospholipids and total 40% solids, and lumisizer instability index was 4.5. No physical instability, e.g. phase separation was observed during its shelf-life at the refrigeration temperature after six months.

Product demonstrated an excellent texture and sensorial properties when added to coffee/tea beverages.

Example 2

Lower Shear and No Foaming Process

Blending 300 lbs. of milk (10% total milk used in the trial) and 300 lbs sugar syrup at 60° C. (66% sugar solid content, 10% total sugar syrup used in the trial) were added into the recirculation loop (so the dry ingredients can be incorporated) without high shear being applied. Only the circulation pump in the high shear mixer is on. The temperature of mixture was maintained at ~38° C., no foam was observed.

The high shear mixer was turned on and 200 lbs nonfat dry milk (NFDM) was added. As soon as NFDM addition is completed the high shear mixer was stopped and recirculation continued to the batch tank. Without high shear, 50 lbs. of vanilla flavor was added. The recirculation loop was closed off and all products removed from the high shear mixer and recirculation loop back into the batch tank.

Figure 5:
FIG. 5: Foam in a batch tank (after 3 days run) from trials with lower shear and no foam process.

With the swept agitators on at ~18 RPM in the batch tank 3200 lbs sugar syrup (66% @60° C.), 3000 lbs skim milk (4° C.), and 2300 lbs cream (4° C.) was added into the batch tank. Blended till a uniform mixture of all ingredients was obtained. Very little or no foam was observed in the batch tank (FIG. 5).

Figure 3:
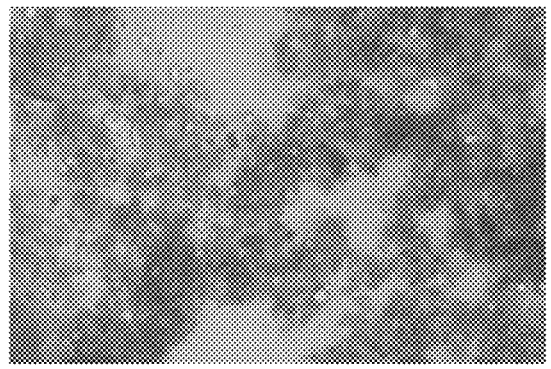
FIG. 3 showed a complete hydration of proteins from non-fat-dried-milk powder by using the processing conditions in the invention
Figure 4:
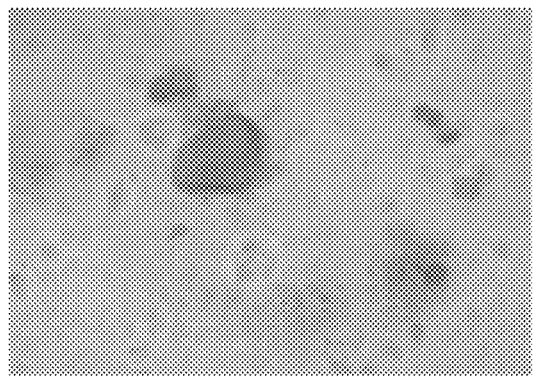
FIG. 4 shows partial or no hydration of protein from non-fat-dried-milk powder when traditional processing conditions known in prior art are used.

The protein hydration was checked with a microscope (FIGS. 3 and 4). FIG. 3 indicated that all proteins were unfolded and hydrated. It results in a mixture with 10% fat, 30% sugar, 2% proteins, 0.08 mg/g phospholipids and total 40% solids.

Pasteurization and Homogenization Pressure and Efficiency

A thermal process was achieved by a UHT treatment at 141° C. for 3 seconds, a typical pasteurization method. Homogenization was achieved by setting second stage at 500 psig and first stage at 2000 psig to give a total of 2500 psig.

Figure 7:
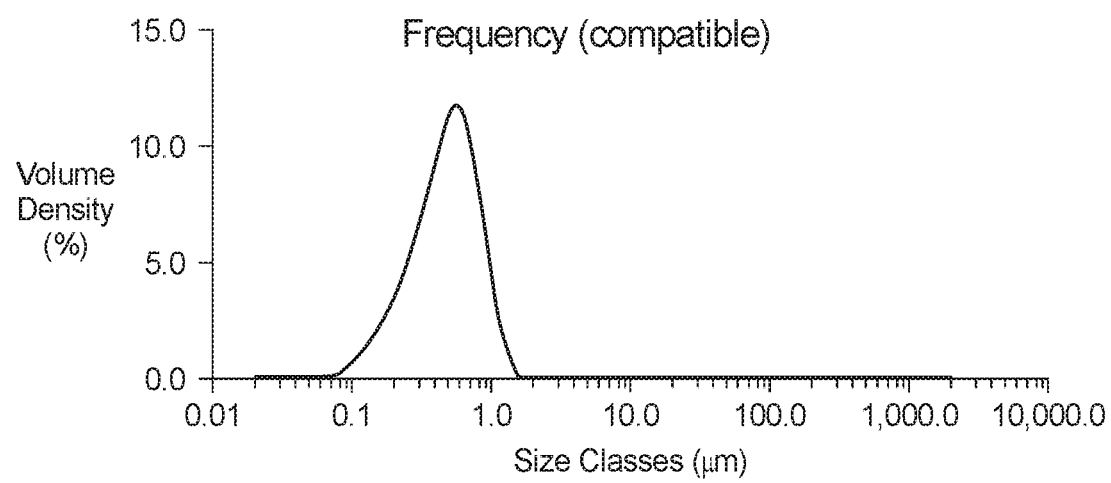
FIG. 7: particle size distribution with a lower shear, additional proteins and hydration after homogenization.

After homogenization, an emulsion was achieved with particle sizes ranging from 0.01 to 2 μm with a d50 <1 μm and d90<1.5 μm, and lack of any reading or particle between 10 ~100 μm (FIG. 7).

Filling, Package and Shipping

After aseptic storage, products were filled at 4° C. into plastic bottles and stored at refrigeration temperature (4° C.) for distributions.

The final product contained 9.3% fat, 30% sugar, 1.8% proteins, 0.08 mg/g phospholipids and total 40% solids, and lumisizer instability index was 3. No physical instability, e.g. phase separation was observed during its shelf-life at the refrigeration temperature after nine months. Product demonstrated an excellent texture and sensorial properties when added to coffee/tea beverages.

The invention claimed is:

1. A process for manufacturing a creamer, the process comprising:
    obtaining a fat including milk fat kept under low agitation or alternative process conditions to avoid foam generation;
    heating a sugar syrup;
    preparing a premix solution comprising liquid milk and the sugar syrup in a 50:50 ratio by mass, the liquid milk comprising at least one of skim milk or whole milk;
    low shear mixing of the premix solution in presence of nonfat dry milk powder to achieve a completed hydration of dry ingredients;
    adding the fat including the milk fat to the premix solution to form a mixture under low agitation such that no or minimal foam is produced, wherein water in the premix solution is obtained from the liquid milk;
    homogenizing the mixture at conditions that obtain an emulsion having a particle size ranging from 0.01 to 2 μm (micrometers) with a d50<1 μm and d90<1.5 μm and having no particles above 10 μm;
    treating the emulsion with ultra-high temperature (UHT) treatment to form the creamer; and
    filling a container with the creamer aseptically at 0.5-20° C.,
    wherein the creamer is free of added emulsifier and has no phase separation for at least 9 months of storage at 0.5-20° C., the creamer has a mass ratio of milk fat:milk proteins less than 5.3:1 and a Lumisizer instability index less than 10, and the creamer comprises the milk fat in amount of 3.3% to 10.2% by mass, added sugar in amount of 1% to 35% by mass and protein in amount of 1% to 5% by mass.

2. The process of claim 1, wherein the UHT treatment temperature is at a minimum temperature of 141° C. for about 3 seconds.

3. The process of claim 1, wherein the creamer has a mass ratio of added sugar:milk proteins ranging from about 35:1 to about 1:5.

4. The process of claim 1, wherein the milk fat is a fat source selected from the group consisting of heavy cream, liquid whole milk, partially defatted liquid milk, whole milk powder, anhydrous milk fat and combinations thereof.

5. The process of claim 1, comprising adding to the premix solution an additional ingredient selected from the group consisting of a flavor, a colorant, and combinations thereof.

6. The process of claim 1, wherein the premix solution undergoing the low shear mixing comprises the liquid milk and the nonfat dry milk powder in a ratio by mass from 1:1 to 2:1.

7. The process of claim 1, wherein the sugar syrup has a temperature of 45° C. to 85° C. when combined with the liquid milk and the nonfat dry milk powder.

* * * * *